United States Patent [19]
Fujita et al.

[11] Patent Number: 5,880,232
[45] Date of Patent: Mar. 9, 1999

[54] PROCESS FOR PRODUCING STYRENE BASED POLYMER AND MOLDED ARTICLES COMPRISING THE POLYMER

[75] Inventors: Masayuki Fujita; Takahiro Ishii, both of Chiba, Japan

[73] Assignee: Sumitomo Chemical Company, Ltd., Osaka, Japan

[21] Appl. No.: 827,057

[22] Filed: Mar. 26, 1997

[30] Foreign Application Priority Data

Mar. 27, 1996 [JP] Japan ................................. 8-072739

[51] Int. Cl.⁶ ........................................ C08F 2/38
[52] U.S. Cl. ..................... 526/205; 526/217; 526/220; 526/222; 526/223
[58] Field of Search ................................. 526/204, 205, 526/217, 220, 222, 223

[56] References Cited

U.S. PATENT DOCUMENTS

| | | | |
|---|---|---|---|
| 2,813,849 | 11/1957 | Kern . | |
| 4,245,072 | 1/1981 | Uraneck et al. | 526/195 |
| 4,370,252 | 1/1983 | Uraneck et al. | 252/311 |
| 4,956,433 | 9/1990 | Mezger | 526/265 |

FOREIGN PATENT DOCUMENTS

| | | |
|---|---|---|
| 0237792A1 | 2/1987 | European Pat. Off. . |
| 3246748 | 9/1993 | Germany . |
| 60-219204 | 11/1985 | Japan . |
| 62-225503 | 10/1987 | Japan . |
| 6-199916 | 7/1994 | Japan . |
| 779216 | 7/1957 | United Kingdom . |
| 2299339 | 10/1996 | United Kingdom . |
| 2304721 | 3/1997 | United Kingdom . |

OTHER PUBLICATIONS

Otsu et al., "Role of Initiator–Transfer Agent–Terminator (Iniferter) in Radical Polymerizations: Polymer Design by Organic Disulfides as Iniferters", *Makromol. Chem., Rapid Commun.*, vol. 3, 1982, pp. 127–132.

Otsu et al., "Living Radical Polymerizations in Homogeneous Solution by Using Organic Sulfides as Photoiniferters", *Polymer Bulletin*, vol. 7, 1982, pp. 45–50.

*Primary Examiner*—Robert Dawson
*Assistant Examiner*—D. Aylward
*Attorney, Agent, or Firm*—Sughrue, Mion, Zinn, Macpeak & Seas, PLLC

[57] ABSTRACT

There is provided a process for producing a styrene based polymer by polymerizing a styrene compound, the process including the step of continuously feeding a styrene compound and one or more sulfide compounds to a reaction zone. The sulfide compounds include dithiocarbamate group-containing sulfide compounds, aryl or arylalkyl group-containing sulfide compounds and thiazole group-containing sulfide compounds. The polymerization is carried out under stirring conditions to maintain the composition of the reaction mixture in the reaction zone uniform and at a predetermined conversion within a range of from 40 to 80% by weight. Polymerization reaction mixture is continuously removed from the reaction zone. The styrene based polymer produced is narrow in molecular weight distribution, and excellent in flowability, mechanical strength and heat resistance.

12 Claims, No Drawings

PROCESS FOR PRODUCING STYRENE BASED POLYMER AND MOLDED ARTICLES COMPRISING THE POLYMER

BACKGROUND OF THE INVENTION

1. Field of the Invention

There is provided a process for producing a styrene based polymer and a molded article comprising the polymer.

2. Description of the Related Art

Styrene based polymers have rigidity, excellent dimensional stability and are low-priced. As a result, they have been widely used for molded articles. It is further noted that there has been a recent demand for making lighter, large-sized moldings in injection molding applications. For making lighter, thinner walled, molded articles, it is essential to have high flowability during molding in addition to high mechanical strength.

In an attempt to meet such requirements, a method has been proposed in which the molecular weight of the polymer is increased in order to obtain a polymer with higher mechanical strength. This method is, however, disadvantageous in that short shot tends to occur on molding due to lowered flowability of the polymer. Even if an article is obtained by the method, the method is disadvantageous in that residual strain of the molded article is increased due to its higher flow shearing, resulting in lowered mechanical strength.

A method in which a plasticizer, such as mineral oil, is added to a polymer has been proposed in order to increase the flowability of the polymer without lowering its molecular weight. The method is disadvantageous, however, in that the heat resistance and the mechanical strength of the polymer are decreased due to the added plasticizer.

In accordance with the disclosure in Flory et al. (L. Am. Chem. Soc., 67, 2048, (1945)), i.e., that mechanical strength of a polymer is proportional to the reciprocal of its number average molecular weight (Mn), it is necessary to increase the number average molecular weight (Mn) of the polymer in order to increase the mechanical strength of the polymer. Also, it is necessary to lower the weight average molecular weight (Mw) of the polymer in order to increase its flowability. Further, Mn should be less than or equal to Mw, it is desirable for a polymer to have narrower molecular weight distribution (Mw/Mn) in order to have high flowability and high mechanical strength.

In order to narrow the molecular weight distribution, a polymerization method using anion polymerization has been proposed. Anion polymerization is disadvantageous, however, in that it requires severe reaction conditions and the manufacturing costs associated therewith are high, as compared with free radical polymerization. Moreover, the product may be colored by residual catalyst.

U.S. Pat. No. 5,401,804 discloses a free radical polymerization method for obtaining a thermoplastic resin having a narrow molecular weight distribution by mixing a free-radical initiator and stable free-radical agent with a polymerizable monomer compound and maintaining the mixture at a temperature of 100° to 160° C. The number average molecular weight of the resin obtained by this method is at most 58,000. Thus, the mechanical strength of the resin is insufficient for use in injection molding, extrusion molding and foam molding.

SUMMARY OF THE INVENTION

It is an object of the present invention to provide a process for producing a styrene based polymer having a narrow molecular weight distribution and a number average molecular weight high enough to provide sufficient mechanical strength, by a free radical polymerization.

Another object of the present invention to provide a process for producing a styrene based polymer having excellent flowability, mechanical strength and heat resistance.

Still another object of the present invention is to provide a industrially advantageous process for producing the aforementioned styrene based polymer.

Other objects and advantages of the present invention will be apparent from the following description and appended claims.

In order to accomplish these objects, there is provided a process for producing a styrene based polymer having a narrow molecular weight distribution, the process comprising the steps of:

(1) continuously feeding a styrene compound and one or more sulfide compounds selected from the group consisting of dithiocarbamate group-containing sulfide compounds, aryl or arylalkyl group-containing sulfide compounds and thiazole group-containing sulfide compounds to a reaction zone, (2) polymerizing the styrene compound with the sulfide compound or compounds in the reaction zone while stirring the contents of the reaction zone to maintain a polymerization conversion at a predetermined level within a range of from 40 to 80% by weight, and (3) continuously removing the resulting polymerization reaction mixture comprising the desired styrene based polymer from the reaction zone.

DETAILED DESCRIPTION OF THE PREFERRED EMBODIMENTS

The present invention is illustrated in detail as follows.

Any suitable styrene compound may be used in the present invention. For example, the styrene compound used in the process of the present invention includes styrene, an α-alkyl-substituted styrene, such as α-methylstyrene and the like, and a nuclear-alkyl-substituted styrene in which the benzene moiety is substituted by an alkyl group, such as p-methylstyrene and the like. Other suitable styrene compounds will be apparent to one skilled in the art.

Also, a monomer copolymerizable with the styrene compound may be employed in the present invention in addition to the styrene compound. For example, a vinyl monomer, such as acrylonitrile, methacrylonitrile, methacrylic acid, methylmethacrylate and the like, maleic anhydride, maleimide, nuclear-alkyl-substituted maleimide and the like, may be used in combination with the styrene compound. Other suitable copolymerizable monomers will be apparent to one skilled in the art.

With regard to the suitable styrene compounds and copolymerizable monomers, the term "alkyl" is intended to mean an alkyl group having 1 to 4 carbon atoms.

Any suitable dithiocarbamate group-containing sulfide compound may be utilized in the present invention. For example, the dithiocarbamate group-containing sulfide compounds used in the present process may be compounds represented by the following formulas (I) to (III):

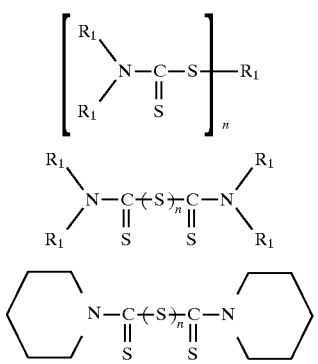

(I)

(II)

(III)

wherein $R_1$ represents an alkyl group having 1 to 4 carbon atoms or an unsubstituted or substituted aryl or arylalkyl group having 6 to 12 carbon atoms and may be the same or different in the same compound, and n represent an integer of 1 to 4, preferably 1 or 2.

Unless otherwise indicated, with regard to all the sulfide compounds used in the present invention, the alkyl group is preferably a methyl or ethyl group, the aryl group is preferably a phenyl group, the arylalkyl group is preferably a benzyl group or a phenethyl group, and the substituted aryl or arylalkyl group is preferably substituted by one, two or three groups selected from alkyl groups having 1 to 4 carbon atoms and alkenyl groups having 2 to 4 carbon atoms, the more preferred substituents being vinyl and methyl. Other suitable dithiocarbamate group-containing sulfide compounds will be apparent to one skilled in the art.

Any suitable aryl or arylalkyl group-containing sulfide compounds may be utilized in the present invention. For example, the aryl or arylalkyl group-containing sulfide compounds may be compounds represented by the following formulas (IV) to (VI):

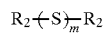 (IV)

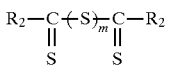 (V)

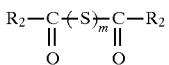 (VI)

wherein $R_2$ represents an aryl or arylalkyl group having 6 to 12 carbon atoms and may be the same or different in the same compound, and m represents an integer of 1 to 4, preferably 1 or 2. Preferably, $R_2$ is phenyl or benzyl. Other suitable aryl or arylalkyl group-containing sulfide compounds will be apparent to one skilled in the art.

Similarly, any suitable thiazole group-containing sulfide compound may be used in the present invention. For example, the thiazole group-containing sulfide compounds used in the present process may be compounds represented by the following formulas (VII) and (VIII):

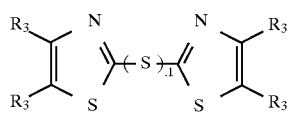 (VII)

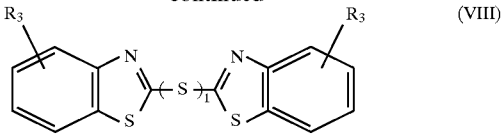 (VIII)

wherein $R_3$ represents a hydrogen atom, an alkyl group having 1 to 4 carbon atoms, or an aryl or arylalkyl group having 6 to 12 carbon atoms and may be the same or different in the same compound, and l represents an integer of 1 to 4, preferably 1 or 2. Preferably, $R_3$ is a hydrogen atom or an alkyl group having 1 to 4 carbon atoms. Other suitable thiazole group-containing sulfide compounds will be apparent to one skilled in the art.

Examples of the compounds represented by the formulas (I) to (VIII) include tetramethylthiuram monosulfide, tetramethylthiuram disulfide, tetramethylthiuram tetrasulfide, tetraethylthiuram monosulfide, tetraethylthiuram disulfide, tetraethylthiuram tetrasulfide, tetrabutylthiuram disulfide, tetrabutylthiuram tetrasulfide, dipentamethylenethiuram disulfide, dipentamethylene-thiuram tetrasulfide, 1,2,4,5-tetrakis (N,N-dimethyldithiocarbamyl-methyl) benzene, 1,2, 4,5-tetrakis (N,N-diethyldithiocarbamyl-methyl) benzene, benzyl-N,N-dimethyldithiocarbamate, benzyl-N,N-diethyldithiocarbamate, 4-vinylbenzyl-N,N-dimethyldithiocarbamate, 4-vinylbenzyl-N,N-diethyldithiocarbamate, 2-phenylethyl-dimethyldithiocarbamate, para-xylylene-N,N-diethyldithiocarbamate, diphenyldisulfide, dibenzyl disulfide, dibenzoyl disulfide, dibenzothiazoyl disulfide and the like.

Among these, preferred are tetramethylthiuram monosulfide, tetramethylthiuram disulfide, tetraethylthiuram disulfide, tetrabutylthiuram disulfide, dipentamethylenethiuram tetrasulfide, 1,2,4,5-tetrakis (N,N-diethyldithiocarbamylmethyl) benzene, benzyl-N,N-dimethyldithiocarbamate, benzyl-N,N-diethyldithiocarbamate, 4-vinylbenzyl-N,N-diethyldithiocarbamate, para-xylylene-N,N-diethyldithiocarbamate, diphenyl disulfide, dibenzoyl disulfide, benzothiazoyl disulfide and the like.

These sulfide compounds may be used alone or in mixtures of two or more.

Suitable amounts of the sulfide compound will also be apparent to one skilled in the art. Preferably, the sulfide compound is utilized in an amount from 50 to 5000 ppm by weight, more preferably from 100 to 3000 ppm by weight, and more preferably from 150 to 1500 ppm by weight, based on the weight of the styrene compound. While amounts outside this range may be usuable, too small and too large amounts are not favorable from a viewpoint of the molecular weight distribution and mechanical strength of the styrene based polymer produced, respectively.

In practicing the process of the present invention, it is necessary to carry out the polymerization in a continuous manner such that the styrene compound and the sulfide compound or compounds are continuously fed to the reaction zone, while continuously removing the resulting polymerization reaction mixture from the reaction zone. In this manner, the styrene compound and the sulfide compound or compounds may be fed to the reaction zone either separately or preferably in a mixture thereof. The polymerization reaction mixture having stayed in the reaction zone for a suitable residence time, as mentioned below, and then removed from the reaction zone comprises a desired styrene based polymer and unreacted styrene compound.

In the process of the present invention, it is also necessary to carry out the polymerization while stirring the contents of the reaction zone. The stirring is carried out to maintain the composition of the contents of the reaction zone uniform and a polymerization conversion, as defined below, to a predetermined level.

The polymerization is preferably carried out by a bulk polymerization.

The residence time of the contents of the reaction zone is dependent on the kind of styrene compound used, a polymerization temperature, a polymerization conversion and the like. Usually, the residence time is from 1 to 10 hours, but other suitable residence times will be apparent to one skilled in the art depending on the foregoing.

The polymerization reaction mixture removed from the reaction zone may be subjected to after-treatment in a manner such that the contents are led to a pre-heating zone maintained at a temperature of 200° to 280° C., and then passed through a deaerating zone under a reduced pressure of, for example, 0.1 to 10 mmHg, at that temperature, whereby unreacted styrene compound can be recovered, while obtaining the desired styrene based polymer.

Alternatively, the polymerization reaction mixture removed may be further subjected to additional polymerization in another reaction zone.

Depending on the polymerization reaction conditions and the like, the viscosity of the contents of the reaction zone may be increased undesirably, such that it may be difficult to control the reaction temperature and to perform the stirring efficiently. Then, it is recommendable to carry out the polymerization by a multiple stage polymerization.

More specifically, the polymerization reaction mixture removed from a first stage polymerization is led to another reaction zone to continue the polymerization in a second stage, if desired, followed by successive stage polymerization procedures. The second stage polymerization and additional other stages, if any, can be carried out under reaction conditions known per se, as far as the first stage polymerization is carried out under conditions as defined in the present invention. However, in the present invention, it is preferred to complete the polymerization in the first stage.

Polymerization conversion in accordance with the present invention is predetermined to a level within a range of from 40 to 80% by weight, more preferably, from 50 to 70% by weight, depending on the kind of the styrene compound used, the polymerization temperature and the like. While polymerization conversions outside this range may be acceptable, those less than 40% by weight should be avoided from an industrial point of view, because productivity is lowered. On the other hand, those more than 80% by weight result in a too high viscosity of the contents of the reaction zone, so that it becomes difficult to control the reaction temperature and moreover it may be necessary to stop the reaction.

The polymerization is preferably carried out at a temperature of from 90° to 160° C. in the presence or absence of an organic peroxide compound.

When the polymerization is carried out in the absence of an organic peroxide compound, the polymerization temperature is preferably from 110° to 160° C., more preferably from 120° to 160° C., and when it is carried out in the presence of an organic peroxide compound, the temperature is preferably from 90° to 140° C., more preferably from 100° to 140° C. While temperatures outside these ranges may be acceptable, a temperature lower than 90° C. tends to lower the productivity, and a temperature exceeding 160° C. tends to lower the molecular weight of the styrene based polymer, resulting in lowered mechanical strength.

The organic peroxide compound is preferably used in an amount of 5000 ppm by weight or less, more preferably 3000 ppm by weight, based on the weight of the styrene compound. Examples of suitable organic peroxide compounds are benzoyl peroxide, t-butyl peroxybenzoate, 1,1-bis(t-butyl peroxy)-3,3,5-trimethylcyclo-hexane, 2,2-bis (4,4-di-t-butyl peroxy cyclohexyl) propane and the like.

With respect to a reactor usable for the polymerization, it is most preferred to use a continuous stirred tank reactor at least in a first stage polymerization, even when the polymerization is carried out by a multiple stage polymerization. In a second stage or additional stages, if any, there can be used any reactor including the continuous stirred tank reactor, a plug flow reactor, and the like.

The styrene based polymer produced in accordance with the present invention may contain known additives, such as lubricants, antistatic agents, antioxidants, thermal stabilizers, ultraviolet absorbents, pigments, dyes, plasticizers, such as a mineral oil, or the like. These additives can be mixed with the styrene based polymer during or after the polymerization reaction.

According to the process of the present invention, there can be industrially advantageously produced a desired styrene based polymer. The styrene based polymer produced in accordance with the present invention is excellent in flowability, mechanical strength and heat resistance and has a weight average molecular weight (Mw) of from about 100,000 to about 500,000, more preferably about 100,000 to about 400,000, a number average molecular weight (Mn) of from about 60,000 to about 300,000, more preferably from about 80,000 to about 200,000, and a narrow molecular weight distribution, which is expressed by the following formulas, $1.0<Mw/Mn<2.0$, more preferably, $1.3<Mw/Mn<1.9$, and $1.0<Mz/Mn<3.4$, more preferably, $1.5<Mz/Mn<3.2$, wherein Mw and Mn are as defined above and Mz is a Z average molecular weight.

The present invention is illustrated in more detail with reference to the following Examples and Comparative Example, which are intended to be illustrative, but not limitative.

Methods of measurement used in Examples and Comparative Example are as follows:

(1) Weight average molecular weight (Mw), number average molecular weight (Mn), Z average molecular weight (Mz) and molecular weight distribution (Mw/Mn, Mz/Mn)

A polymer sample was dissolved in tetrahydrofuran to form a solution having a concentration of 0.5 mg/ml and the solution was assayed by gel permeation chromatography (GPC). The GPC had a differential refractometer and the weight average molecular weight (Mw), number average molecular weight (Mn), Z average molecular weight (Mz) and molecular weight distribution (Mw/Mn, Mz/Mn) were obtained by a calibration curve prepared using a monodispersity polystyrene.

(2) Flowability (melt flow rate (MFR))

The measurement was conducted three times at a resin temperature of 200° C. under a load of 5 kg according to JIS K7210 and an average of the measured values was taken as a melt flow rate.

(3) Mechanical strength (bending fracture strength)

The measurement was conducted three times at a measuring temperature of 23° C. according to JIS K7203 and an average of the measured values was taken as a mechanical strength.

(4) Vicat softening point

The measurement was conducted under a load of 5 kg according to JIS K7203.

(5) Polymerization conversion

A polymer sample (0.1 g) was removed from the reactor and was precisely weighed and dried at 80° C. for 1 hour and for an additional 2 hours under vacuum at 150° C. The polymerization conversion was calculated, as a percentage value, by dividing the weight of the dried polymer sample by the weight of the polymer sample before drying.

EXAMPLES 1 AND 2 AND COMPARATIVE EXAMPLE 1

A mixture of styrene, ethylbenzene and tetraethylthiuram disulfide (trademark Soxinol TET, produced and sold by Sumitomo Chemical Co., Ltd.) in the weight proportion as shown in the following Table was continuously fed into a 26 parts by volume continuous stirred tank reactor. The polymerization was continued while stirring was conducted at the temperature and polymerization conversion also shown in the following Table, while the polymerization reaction mixture was continuously removed from the reactor. The volume of the polymerization reaction mixture in the tank was 15 parts by volume and the residence time of the polymerization reaction mixture in the reactor was 3 hours.

The polymerization reaction mixture removed from the reactor was led to a pre-heater kept at 240° C., and then passed through a deaerator under vacuum at that temperature, thereby removing the unreacted monomer, etc.

The resulting polymer was formed into pellets using an extruder and a pelletizer, which pellets were used for the measurement of each average molecular weight and molecular weight distribution.

Successively, the pelletized polymer was molded into a test specimen using an injection molding machine under conditions of a cylinder temperature of 200° C. and a molding temperature of 40° C., for the measurements of bending strength, MFR and vicat softening point.

The results are as shown in the following Table.

|  | Example 1 | Example 2 | Comparative Example 1 |
|---|---|---|---|
| Composition of feed mixture: |  |  |  |
| Styrene (% by wt.) | 95 | 95 | 95 |
| Ethylbenzene (% by wt.) | 5 | 5 | 5 |
| Tetraethylthiuram disulfide (ppm) | 200 | 1000 | 0 |
| Polymerization temperature (°C.) | 135 | 130 | 130 |
| Polymerization conversion (% by wt.) | 50 | 50 | 50 |
| Mw (×10$^4$) | 25 | 13 | 29 |
| Mn (×10$^4$) | 13 | 7 | 14 |
| Mz (×10$^4$) | 41 | 21 | 48 |
| Mw/Mn | 1.9 | 1.9 | 2.1 |
| Mz/Mn | 3.2 | 3.0 | 3.4 |
| Measurement Results |  |  |  |
| Bending fracture strength (kg/cm$^2$) | 830 | 470 | 830 |
| Flowability (MFR) (g/10 min) | 2.6 | 15.0 | 1.7 |
| Vicat softening point (°C.) | 102.4 | 103.2 | 101.8 |

Although the present invention has been described in connection with preferred embodiments thereof, many other variations and modifications and other uses will become apparent to those skilled in the art without departing from the scope of the invention. It is preferred, therefore, that the present invention not be limited by the specific disclosure herein, but only by the appended claims.

We claim:

1. A process for producing a styrene based polymer by free radical polymerization, comprising the steps of:
   (1) continuously feeding a styrene compound and one or more sulfide compounds selected from the group consisting of dithio-carbamate group-containing sulfide compounds, aryl or arylalkyl group-containing sulfide compounds and thiazole group-containing sulfide compounds to a reaction zone, the amount of the sulfide compound being from 50 to 5,000 ppm by weight based on the weight of the styrene compound,
   (2) polymerizing the styrene compound with the sulfide compound or compounds in the reaction zone while stirring the contents of the reaction zone to maintain the composition of the contents of the reaction zone uniform and the polymerization conversion at a predetermined level within a range of from 40 to 80% by weight, and
   (3) continuously removing the resulting polymerization reaction mixture from the reaction zone, the polymerization being carried out by a bulk polymerization method, whereby there is obtained a styrene base polymer having a weight average molecular weight (Mw) of from 100,000 to 500,000, a number average molecular weight (Mn) of from 60,000 to 300,000, and a molecular weight distribution of 1.0<Mw/Mn<2.0 and 1.0<Mz/Mn<3.4, wherein Mn and Mw are as defined above and Mz is a Z average molecular weight.

2. A process according to claim 1, wherein the polymerization is conducted at a temperature of from 90° to 160° C.

3. A process according to claim 2, wherein the polymerization is conducted at a temperature of from 110° to 160° C. in the absence of an organic peroxide.

4. A process according to claim 2, wherein the polymerization is conducted at a temperature of from 90° to 140° C. in the presence of an organic peroxide.

5. A process according to claim 1, wherein the polymerization is carried out using a continuous stirred tank reactor.

6. A process according to claim 1, wherein the polymerization reaction mixture removed from the reaction zone is subjected to after-treatment, thereby obtaining a desired styrene based polymer.

7. A process according to claim 1, wherein the polymerization reaction mixture removed from the reaction zone is subjected to additional polymerization.

8. A process according to claim 1, wherein the sulfide compound is a dithiocarbamate group-containing sulfide compound represented by the formulas (I) to (III)

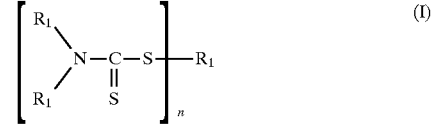

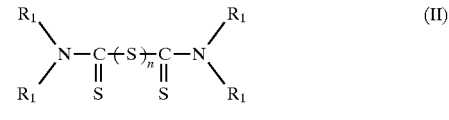

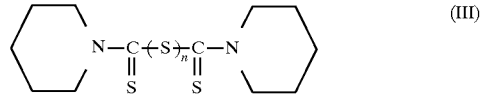

wherein $R_1$ represents an alkyl group having 1 to 4 carbon atoms or an unsubstituted or substituted aryl or arylalkyl group having 6 to 12 carbon atoms and may be the same or different in the same compound, and n represents an integer of 1 to 4.

9. A process according to claim 1, wherein the sulfide compound is an alkyl or arylalkyl group-containing sulfide compound represented by the formulas (IV) to (VI),

 (IV)

 (V)

 (VI)

wherein $R_2$ represents an aryl or arylalkyl group having 6 to 12 carbon atoms and may be the same or different in the same compound, and m represents an integer of 1 to 4.

10. A process according to claim 1, wherein the sulfide compound is a thiazole group-containing sulfide compound represented by the formulas (VII) and (VIII),

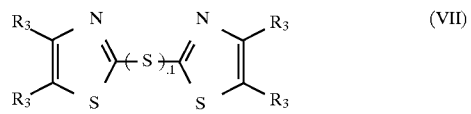 (VII)

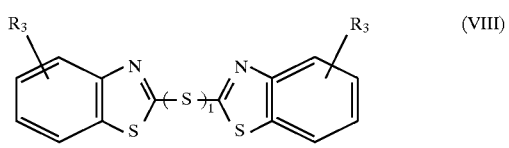 (VIII)

wherein $R_3$ represents a hydrogen atom, an alkyl group having 1 to 4 carbon atoms, or an aryl or arylalkyl group and may be the same or different in the same compound, and l represents an integer of 1 to 4.

11. A styrene based polymer prepared by the process according to claim 1.

12. A molded article, comprising the styrene based polymer according to claim 11.

* * * * *